United States Patent
Yasuda et al.

(10) Patent No.: US 11,008,975 B2
(45) Date of Patent: May 18, 2021

(54) INTERNAL COMBUSTION ENGINE

(71) Applicant: HONDA MOTOR CO., LTD., Tokyo (JP)

(72) Inventors: Yukihiro Yasuda, Wako (JP); Hiroyuki Uchida, Wako (JP); Kazuya Tanabe, Wako (JP); Takao Iwasaki, Wako (JP); Takuya Warashina, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/492,680

(22) PCT Filed: Feb. 15, 2018

(86) PCT No.: PCT/JP2018/005188
§ 371 (c)(1),
(2) Date: Sep. 10, 2019

(87) PCT Pub. No.: WO2018/179951
PCT Pub. Date: Oct. 4, 2018

(65) Prior Publication Data
US 2020/0049101 A1    Feb. 13, 2020

(30) Foreign Application Priority Data

Mar. 30, 2017    (JP) .............................. JP2017-068896

(51) Int. Cl.
*F02F 7/00* (2006.01)
*F02B 61/02* (2006.01)
(Continued)

(52) U.S. Cl.
CPC ............ *F02F 7/0021* (2013.01); *F02B 61/02* (2013.01); *F02B 63/042* (2013.01);
(Continued)

(58) Field of Classification Search
CPC ....... F02F 7/0021; F02F 7/0053; F02B 61/02; F02B 63/042; F02B 77/087; F02B 75/22;
(Continued)

(56) References Cited

U.S. PATENT DOCUMENTS

| | | | |
|---|---|---|---|
| 652,799 A | * | 7/1900 | Miller ..................... B62L 5/003 |
| | | | 192/217.1 |
| 2005/0061287 A1 | | 3/2005 | Takahashi et al. |
| 2011/0156728 A1 | | 6/2011 | Sato et al. |

FOREIGN PATENT DOCUMENTS

| | | | | |
|---|---|---|---|---|
| CN | 102649463 A | * | 8/2012 | ............. B60K 6/383 |
| CN | 106351742 A | * | 1/2017 | ............. G01M 1/24 |

(Continued)

OTHER PUBLICATIONS

International Search Report, issued in PCT/JP2018/005188, dated May 22, 2018.

(Continued)

*Primary Examiner* — Jacob M Amick
*Assistant Examiner* — Charles Brauch
(74) *Attorney, Agent, or Firm* — Birch, Stewart, Kolasch & Birch LLP

(57) ABSTRACT

An internal combustion engine includes a crankshaft that has a journal linked to a bearing and is rotatably supported on the crankcase, a power transmission gear fixed to an extremity of the crankshaft that has a smaller diameter than a diameter of the journal and projects outward of the crankcase, a to-be-detected body that is fixed on an outer periphery of a collar member disposed between the bearing and the power transmission gear and is relatively non-rotatably supported on the crankshaft, and a detection sensor that is made to face a trajectory of the to-be-detected body and detects movement of the to-be-detected body to generate a pulse signal. This provides a structure for disposing a (Continued)

to-be-detected body that enables any increase in the dimensions of an internal combustion engine to be avoided.

5 Claims, 4 Drawing Sheets

(51) Int. Cl.
 *F02B 63/04* (2006.01)
 *F02D 41/00* (2006.01)
 *F16C 3/06* (2006.01)
 *G01M 15/06* (2006.01)
 *G01D 5/245* (2006.01)
(52) U.S. Cl.
 CPC .......... *F02D 41/009* (2013.01); *F02F 7/0053* (2013.01); *F16C 3/06* (2013.01); *G01M 15/06* (2013.01); *G01D 5/245* (2013.01)
(58) Field of Classification Search
 CPC ...... F02D 41/009; G01M 15/06; G01D 5/245; G01D 5/2457; F16C 2360/22; F16C 41/007; F16C 3/06
 See application file for complete search history.

(56) References Cited

FOREIGN PATENT DOCUMENTS

| | | | | |
|---|---|---|---|---|
| JP | 3-206340 | A | 9/1991 | |
| JP | 4-203226 | A | 7/1992 | |
| JP | 8-93886 | A | 4/1996 | |
| JP | 10-220263 | A | 8/1998 | |
| JP | 10-331681 | A | 12/1998 | |
| JP | 2000-283989 | A | 10/2000 | |
| JP | 2001-55944 | A | 2/2001 | |
| JP | 2001055944 | A * | 2/2001 | .............. F02B 75/22 |
| JP | 2005-90662 | A | 4/2005 | |
| JP | 2012-197712 | A | 10/2012 | |
| JP | 2013-174338 | A | 9/2013 | |

OTHER PUBLICATIONS

Office Action issued in Indian Application No. 201917043255, dated Nov. 26, 2020.

* cited by examiner

INTERNAL COMBUSTION ENGINE

TECHNICAL FIELD

The present invention relates to an internal combustion engine that includes a crankshaft that has a journal linked to a bearing and is rotatably supported on a crankcase, and a power transmission gear fixed to an extremity of the crankshaft that has a smaller diameter than that of the journal and projects outward of the crankcase.

BACKGROUND ART

Patent Document 1 discloses a timing pulse detection device for an internal combustion engine. The timing pulse detection device includes a detection member (to-be-detected body) fixed to a crankshaft. The detection member is disposed between a pulley for a timing belt and a step of the crankshaft. The step projects outward from a bearing in the axial direction of the crankshaft. This ensures that there is a gap between an outer face of a crankcase and the detection member.

RELATED ART DOCUMENTS

Patent Documents

Patent Document 1: Japanese Patent Application Laid-open No. 10-220263

SUMMARY OF THE INVENTION

Problems to be Solved by the Invention

However, in the internal combustion engine described in Patent Document 1, the length of the crankshaft is increased by the portion via which the step projects. The dimensions of the internal combustion engine increase. Moreover, the shaft diameter on the extremity side of the crankshaft has to be decreased due to the step being formed. When transmitting power, if the shaft diameter is ensured for the extremity of the crankshaft, the journal of the crankshaft or the bearing is required to have an increased diameter, thus causing an increase in the weight of the internal combustion engine.

The present invention has been accomplished in light of the above circumstances, and it is an object thereof to provide a structure for disposing a to-be-detected body that enables any increase in the dimensions of an internal combustion engine to be avoided.

Means for Solving the Problems

According to a first aspect of the present invention, there is provided an internal combustion engine comprising a crankcase that defines a crank chamber, a crankshaft that has a journal linked to a bearing and is rotatably supported on the crankcase, a power transmission gear fixed to an extremity of the crankshaft that has a smaller diameter than a diameter of the journal and projects outward of the crankcase, a to-be-detected body that is provided on an outer periphery of a collar member sandwiched between the bearing and the power transmission gear and is relatively non-rotatably supported on the crankshaft, a detection sensor that is made to face a trajectory of the to-be-detected body and detects movement of the to-be-detected body to generate a pulse signal, a key groove that is formed in inner peripheral faces of the power transmission gear and the collar member and extends in an axial direction of the crankshaft, and a key member that projects from an outer periphery of the crankshaft and is fitted into the key groove, the key member engaging with the key groove and being disposed between the power transmission gear and collar member and the crankshaft.

According to a second aspect of the present invention, in addition to the first aspect, the internal combustion engine comprises a key groove that is formed in an inner peripheral face of the collar member and extends in an axial direction of the crankshaft, and a key member that projects from an outer periphery of the crankshaft and is fitted into the key groove.

According to a third aspect of the present invention, in addition to the first or second aspect, the internal combustion engine comprises an AC generator that is connected to an extremity of the crankshaft that projects outward from the crankcase in the axial direction of the crankshaft on a side opposite to the power transmission gear with respect to the crankcase.

According to a fourth aspect of the present invention, in addition to any one of the first to third aspects, the to-be-detected body is integrated with the collar member.

According to a fifth aspect of the present invention, in addition to any one of the first to fourth aspects, the detection sensor is provided on an upper face of the crankcase to the rear of the cylinder block in a vehicle body.

According to a sixth aspect of the present invention, in addition to any one of the first to fifth aspects, the internal combustion engine further comprises a case cover that supports the extremity of the crankshaft.

Effects of the Invention

In accordance with the first aspect, since the to-be-detected body is provided on the outer periphery of the collar member, one step may be formed on the crankshaft between the journal and the extremity side. Any increase in the length of the crankshaft can be avoided. Moreover, when transmitting power, a sufficient shaft diameter is ensured for the extremity of the crankshaft. Any increase in the dimensions of the internal combustion engine can thus be avoided. Since the extremity of the crankshaft projects outside the crankcase with a diameter that is smaller than that of the journal, the journal can be withdrawn from the outer face of the bearing in the axial direction of the crankshaft, and the journal can therefore easily be fitted into the bearing, and when fitting the collar member, the angular position of the collar member around the rotational axis of the crankshaft can be determined by the key member, thus making it possible to set the angular position of the to-be-detected body around the rotational axis of the crankshaft in this way.

In accordance with the second aspect, when fitting the collar member, the angular position of the collar member around the rotational axis of the crankshaft can be determined by the key member. The angular position of the to-be-detected body around the rotational axis of the crankshaft can be set in this way.

In accordance with the third aspect, since the AC generator and the detection sensor are separated and disposed at opposite ends of the crankshaft, the influence of the electromagnetic force of the AC generator on the detection sensor can be avoided.

In accordance with the fourth aspect, due to the to-be-detected body being integrated with the collar member, the number of components can be reduced, and the number of assembly steps can be cut.

In accordance with the fifth aspect, the detection sensor can be protected from stones, etc. scattered up from the road surface.

In accordance with the sixth aspect, since the crankshaft is doubly supported between the crankcase and the case cover, it is possible to prevent crankshaft run-out.

EXPLANATION OF REFERENCE NUMERALS AND SYMBOLS

Figure 1:
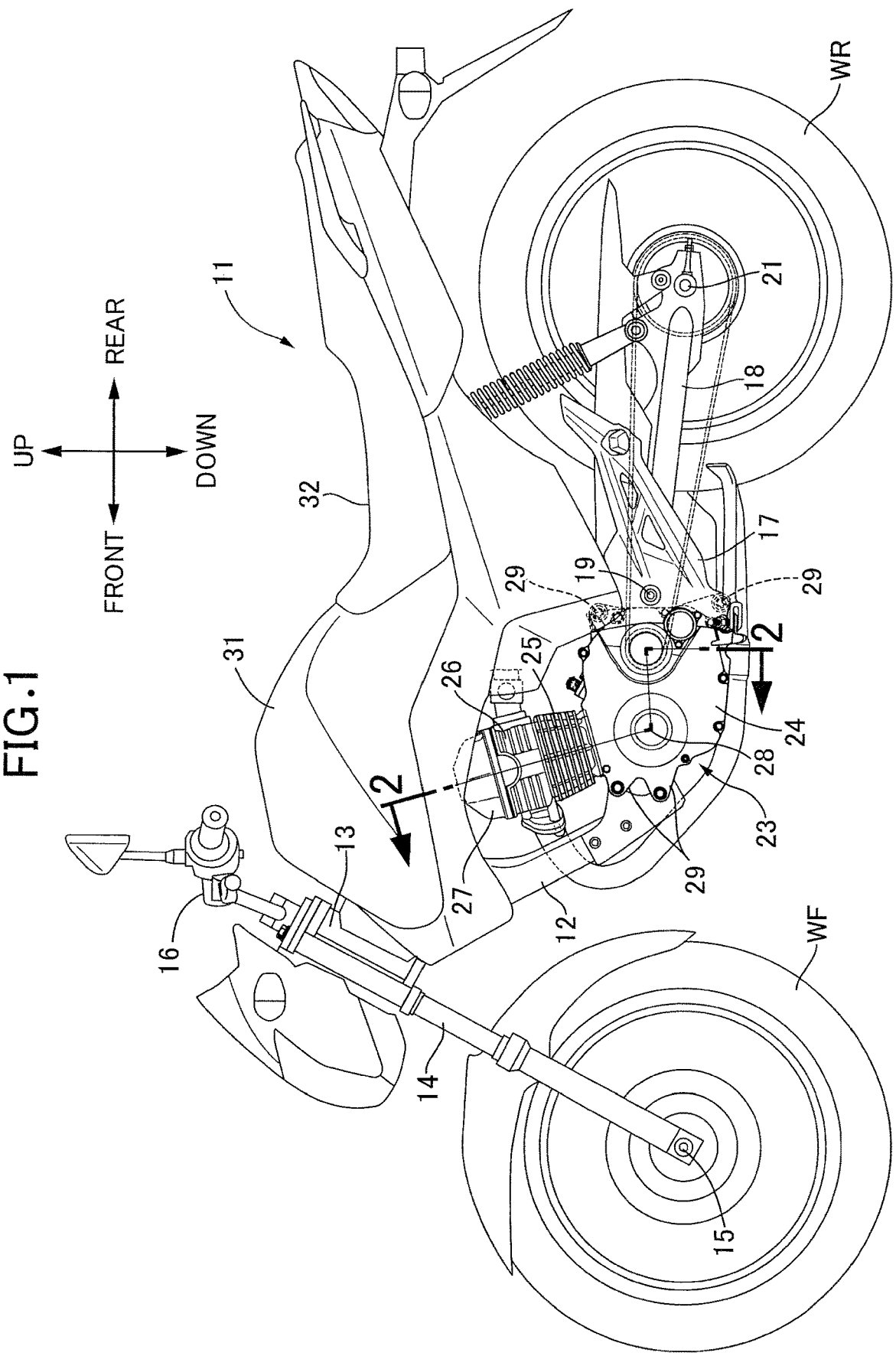
FIG. 1 is a side view schematically showing the overall arrangement of a two-wheeled motor vehicle.

23 Internal combustion engine
23a Internal combustion engine
24 Crankcase
37 Crankshaft
37b Journal
39 Bearing
42 Crank chamber
47 ACG (AC generator) starter as AC generator
55 Power transmission gear
56 Collar member
58 Key groove
59 Key member
82 To-be-detected body (pulser ring)
83 Detection sensor (pulser sensor)
93 Case cover (clutch cover)

MODES FOR CARRYING OUT THE INVENTION

One embodiment of the present invention is explained below by reference to the attached drawings. Here, the top and bottom, front and rear, and left and right of a vehicle body are defined based on the point of view of a person riding a two-wheeled motor vehicle.

FIG. 1 schematically shows the overall arrangement of a two-wheeled motor vehicle related to one embodiment of the present invention. A two-wheeled motor vehicle 11 includes a vehicle body frame 12. A front fork 14 is steerably supported on a head pipe 13 at the front end of the vehicle body frame 12. A front wheel WF is supported by the front fork 14 so that it can rotate around an axle 15. Handlebars 16 are joined to the front fork 14 on the upper side of the head pipe 13. A swing arm 18 is supported on a pivot frame 17 on the rear side of the vehicle body frame 12 so that it can swing around a support shaft 19 extending horizontally in the vehicle width direction. A rear wheel WR is supported at the rear end of the swing arm 18 so that it can rotate around an axle 21.

An internal combustion engine 23 is mounted on the vehicle body frame 12 between the front wheel WF and the rear wheel WR. The internal combustion engine 23 includes a crankcase 24, a cylinder block 25 joined to the crankcase 24, extending upward from the crankcase 24, and having a forwardly inclined cylinder axis, a cylinder head 26 joined to the cylinder block 25, and a head cover 27 joined to the cylinder head 26. A crankshaft 37 (described later) rotating around a rotational axis 28 extending in parallel with the axle 21 of the rear wheel WR is housed in the crankcase 24. The rotation of the crankshaft 37 is transmitted to the rear wheel WR via a transmission device (not illustrated). Engine hangers 29 are formed on the crankcase 24, with two at the front and two at the rear. The engine hangers 29 are arranged vertically at the front and the rear respectively. The crankcase 24 is linked and fixed to the vehicle body frame 12 via the engine hangers 29.

A fuel tank 31 is mounted on the vehicle body frame 12 above the internal combustion engine 23. A rider's seat 32 is mounted on the vehicle body frame 12 to the rear of the fuel tank 31. Fuel is supplied from the fuel tank 31 to a fuel injection device of the internal combustion engine 23. When driving the two-wheeled motor vehicle 11 a rider straddles the rider's seat 32.

Figure 2:
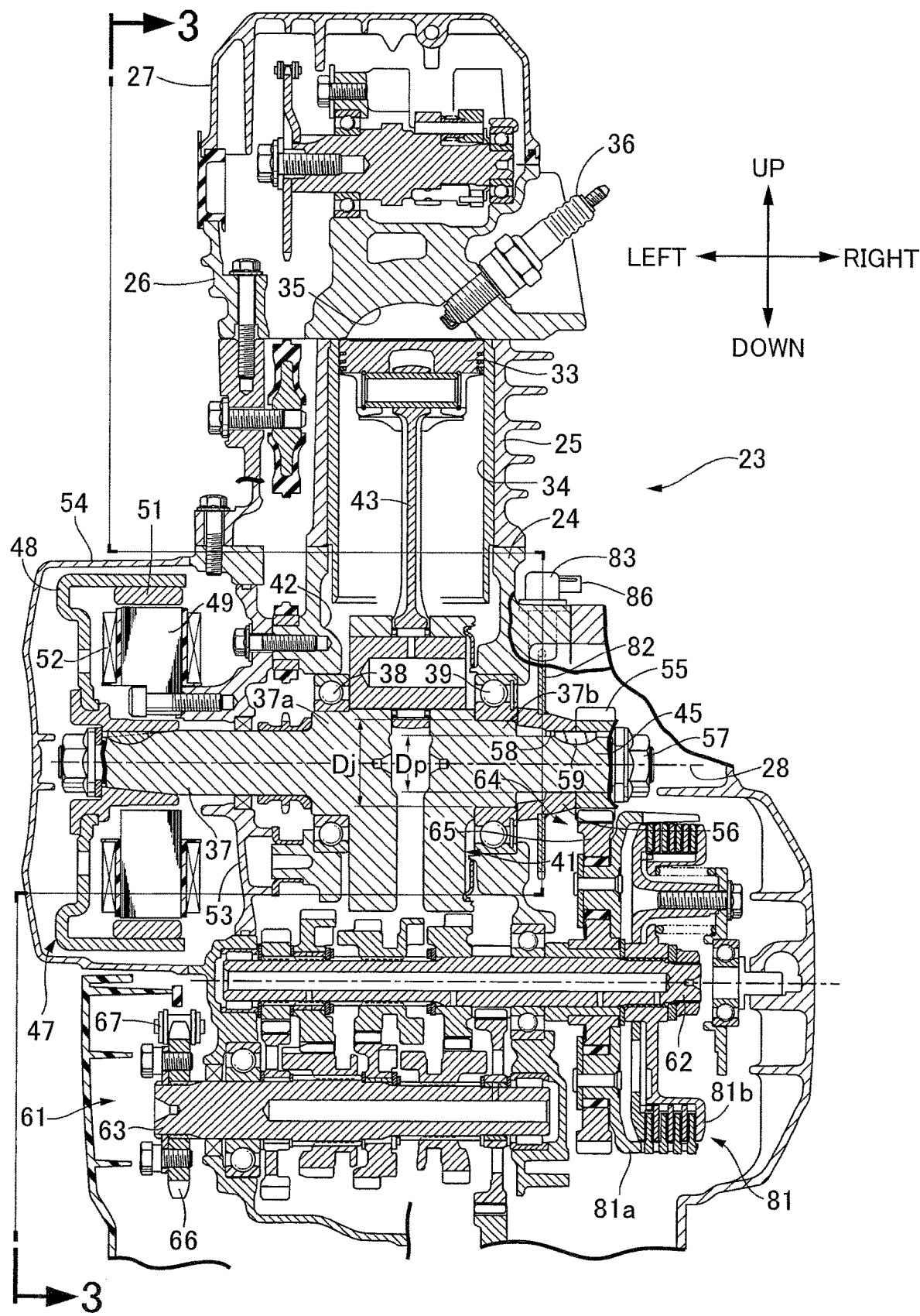
FIG. 2 is an enlarged partial sectional view of the two-wheeled motor vehicle along line 2-2 in FIG. 1.

As shown in FIG. 2, the internal combustion engine 23 includes a piston 33 incorporated into the cylinder block 25. The piston 33 is housed in a cylinder 34 defined within the cylinder block 25. Here, the cylinder 34 formed in the cylinder block 25 is a single cylinder, and the piston 33 received by the cylinder 34 is a single piston. A combustion chamber 35 is defined between the piston 33 and the cylinder head 26. A spark plug 36 extending to the combustion chamber 35 is mounted in the cylinder head 26.

The internal combustion engine 23 includes the crankshaft 37 supported on the crankcase 24 so that it can rotate around the axes of journals 37a and 37b. The axes of the journals 37a and 37b coincide with the rotational axis 28. The crankshaft 37 is linked to bearings 38 and 39 via the journals 37a and 37b. The bearings 38 and 39 are formed from a ball bearing. Outer races of the bearings 38 and 39 are fitted into the crankcase 24. The journals 37a and 37b are fitted into inner races of the bearings 38 and 39. A plurality of balls are arranged between the outer race and the inner race.

A crank 41 of the crankshaft 37 is housed in a crank chamber 42 defined in the crankcase 24 between the two journals 37a and 37b. A connecting rod 43 is linked to the crank 41 of the crankshaft 37 within the crank chamber 42. The connecting rod 43 converts axial movement of the piston 33 into rotation of the crankshaft 37.

An ACG (AC generator) starter 47 is connected to one end of the crankshaft 37 that projects outward in one direction from the crankcase 24. The ACG starter 47 includes a rotor 48 and a stator 49. The rotor 48 is relatively non-rotatably joined to the one end of the crankshaft 37 projecting out of the crankcase 24. The rotor 48 has a plurality of magnets 51 arranged in the peripheral direction. The rotor 48 surrounds the outer periphery of the stator 49. A plurality of coils 52 arranged in the peripheral direction are wound around the stator 49. The coils 52 follow a trajectory that faces the trajectory of the magnets 51 when the rotor 48 rotates. The ACG starter 47 functions as a starter motor that automatically starts to operate the crankshaft 37 when the internal combustion engine 23 is started and functions as an AC generator once starting of the internal combustion engine 23 is confirmed.

An oil separator 53 is joined to the crankcase 24. A space for housing a valve operating mechanism is defined between the oil separator 53 and the crankcase 24. The stator 49 is supported on the oil separator 53. A generator cover 54 is joined to the oil separator 53. The rotor 48 and the stator 49 are housed in a space defined by the generator cover 54 and the oil separator 53.

A power transmission gear 55 is fixed to the other end of the crankshaft 37, which projects outward in the other direction from the crankcase 24. A shaft diameter Dp on the other end side of the crankshaft 37 is smaller than a diameter Dj of the journal 37b. A collar member 56 is disposed between the power transmission gear 55 and the bearing 39. The collar member 56 is sandwiched between the power transmission gear 55 and the bearing 39. A stopper member 57 is fastened to the other end of the crankshaft 37. The stopper member 57 presses the power transmission gear 55 and the collar member 56 against the inner race of the bearing 39. In this way, the stopper member 57 restricts displacement in the axial direction of the power transmission gear 55 and the collar member 56.

A key groove 58 extending in the axial direction of the crankshaft 37 is formed in inner peripheral faces of the power transmission gear 55 and the collar member 56. The key groove 58 is continuous between the power transmission gear 55 and the collar member 56. A key member 59 projecting from the outer periphery of the crankshaft 37 is fitted into the key groove 58. The key member 59 has a linear region that is axially slidably received by the key groove 58 and a curved region that is received by a depression indented toward the axis of the crankshaft 37 on the side opposite to the linear region. The curved region enters the depression at the other end of the crankshaft 37 to restrict displacement of the key member 59 in the axial direction. The key member 59 engages with the key groove 58 in the rotational direction of the crankshaft 37 and restricts relative rotation between the power transmission gear 55 and collar member 56 and the crankshaft 37.

A dog clutch type multistage transmission 61 is incorporated into the internal combustion engine 23. The multistage transmission 61 is housed within the crankcase 24. The multistage transmission 61 includes an input shaft 62 and an output shaft 63 having axes in parallel with the axis of the crankshaft 37. The input shaft 62 and the output shaft 63 are rotatably supported on the crankcase 24 via a bearing. The input shaft 62 is connected to the crankshaft 37 through a primary reduction mechanism 64. The primary reduction mechanism 64 includes the power transmission gear 55 and a driven gear 65 relatively rotatably supported on the output shaft 63. The driven gear 65 meshes with the power transmission gear 55.

A drive sprocket 66 of a transmission device is joined to the output shaft 63. A drive chain 67 is wound around the drive sprocket 66. The drive chain 67 transmits the rotational power of the drive sprocket 66 to the rear wheel WR.

A friction clutch 81 is incorporated into the internal combustion engine 23. The friction clutch 81 includes a clutch outer 81a and a clutch hub 81b. The driven gear 65 of the primary reduction mechanism 64 is linked to the clutch outer 81a. It is possible to switch between connection and disconnection between the clutch outer 81a and the clutch hub 81b in the friction clutch 81 in response to operation of a clutch lever.

The internal combustion engine 23 includes a pulser ring (to-be-detected body) 82 fixed to the outer periphery of the collar member 56 and relatively non-rotatably supported on the crankshaft 37. The pulser ring 82 is formed into an annular plate shape that is joined to the crankshaft 37 so as to be coaxial with the rotational axis 28 and rotates integrally with the crankshaft 37. The pulser ring 82 is integrated with the collar member 56. The pulser ring 82 may for example be welded to the collar member 56.

Figure 3:
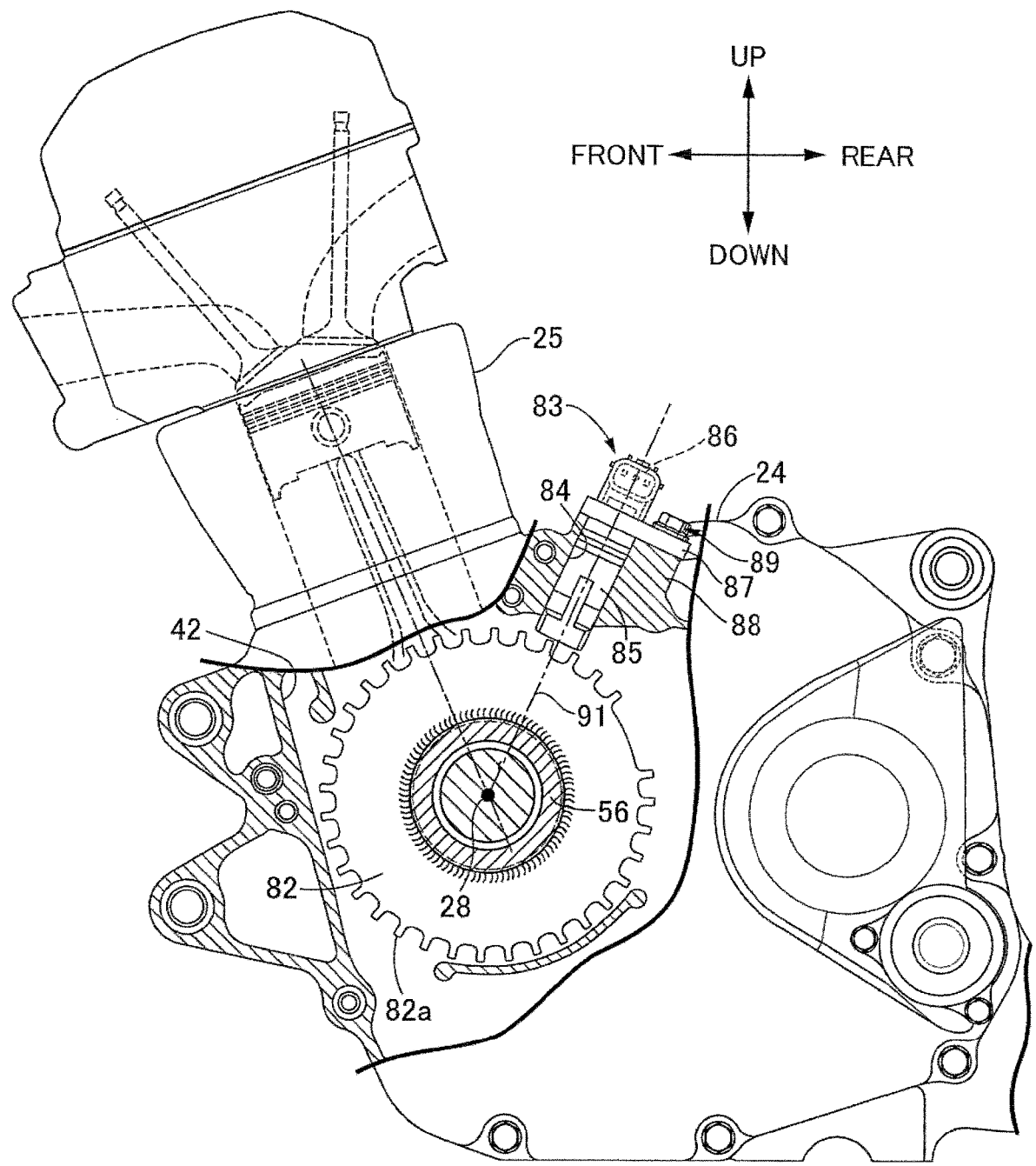
FIG. 3 is a partially cutaway side view schematically showing the structure of an internal combustion engine.

As shown in FIG. 3, the pulser ring 82 includes a plurality of reluctors 82a arranged at equal intervals in an annular shape around the rotational axis 28. The reluctors 82a are disposed with a central angle of for example 10 degrees therebetween. The reluctor 82a is formed from for example a magnetic body.

The internal combustion engine 23 includes a pulser sensor (detection sensor) 83 that is made to face the annular trajectory of the pulser ring 82 and detects movement of the pulser ring 82 to generate a pulse signal. The pulser sensor 83 includes a main body 85 that is inserted from the outside into a through hole 84 formed in the crankcase 24 and faces the crank chamber 42 via a detecting part at the extremity, a connector 86 that is joined to the main body 85 and disposed in a space outside the crankcase 24, and a fastening piece 87 that is joined to the main body 85 and fastened to the crankcase 24. The pulser sensor 83 outputs an electric signal in response to the existence of a magnetic body detected on the trajectory of the pulser ring 82. The pulser sensor 83 outputs a pulse signal specifying an angular position of the crankshaft 37. Alternatively, the pulser sensor 83 may employ an eddy current type microdisplacement sensor.

The fastening piece 87 is superimposed on an upper face of a pedestal 88 projecting from an upper face of the crankcase 24 and is fastened to the pedestal 88 by means of a bolt 89. In the pulser sensor 83 a detection axis 91 is oriented to the rotational axis 28 of the crankshaft 37. The pulser sensor 83 is retained in an attitude in which it is inclined with respect to the vehicle vertical direction, which is orthogonal to the ground. Here, the pulser sensor 83 is disposed on an upper side of the crankcase 24 to the rear of the cylinder block 25.

The operation of the present embodiment is now explained. In the internal combustion engine 23 the crankshaft 37 rotates in response to combustion. While the crankshaft 37 is rotating, the pulser ring 82 rotates integrally with the crankshaft 37. The pulser sensor 83 outputs a pulse signal in response to movement of the pulser ring 82. Since the pulser ring 82 is fixed to the outer periphery of the collar member 56, one step may be formed on the crankshaft 37 between the journal 37b and the extremity side. Any increase in the length of the crankshaft 37 is avoided. Moreover, when transmitting power a sufficient shaft diameter is ensured for the extremity of the crankshaft 37. Any increase in the dimensions of the internal combustion engine 23 is thus avoided. Furthermore, since the collar member 56 is sandwiched between the inner race of the bearing 39 and the power transmission gear 55, the journal 37b can be withdrawn from the outer face of the bearing 39 in the axial direction of the crankshaft 37, and the journal 37b can therefore easily be fitted into the bearing 39.

In the present embodiment, when fitting the collar member 56 the angular position of the collar member 56 around the rotational axis 28 of the crankshaft 37 is determined by the key member 59. The angular position of the pulser ring 82 around the rotational axis 28 of the crankshaft 37 is set in this way.

The ACG starter 47 is connected to one end of the crankshaft 37 projecting outside from the crankcase 24 in the axial direction of the crankshaft 37 on the side opposite to the power transmission gear 55 with respect to the crankcase 24. The ACG starter 47 and the pulser sensor 83 are separated and disposed at opposite ends of the crankshaft 37. The influence of the electromagnetic force of the AC generator on the pulser sensor 83 can thus be avoided. In the present embodiment, the AC generator is also used as a starter motor; when a starter motor is disposed separately from an AC generator, the starter motor may be disposed at a position opposing the pulser sensor 83 with respect to the rotational axis 28 of the crankshaft 37. In accordance with such an arrangement, any influence of the electromagnetic force of the starter motor on the pulser sensor 83 can be avoided.

In the present embodiment, the pulser ring 82 is integrated with the collar member 56. Due to the pulser ring 82 being thus integrated with the collar member 56, the number of components can be reduced, and the number of assembly steps can be cut.

Figure 4:
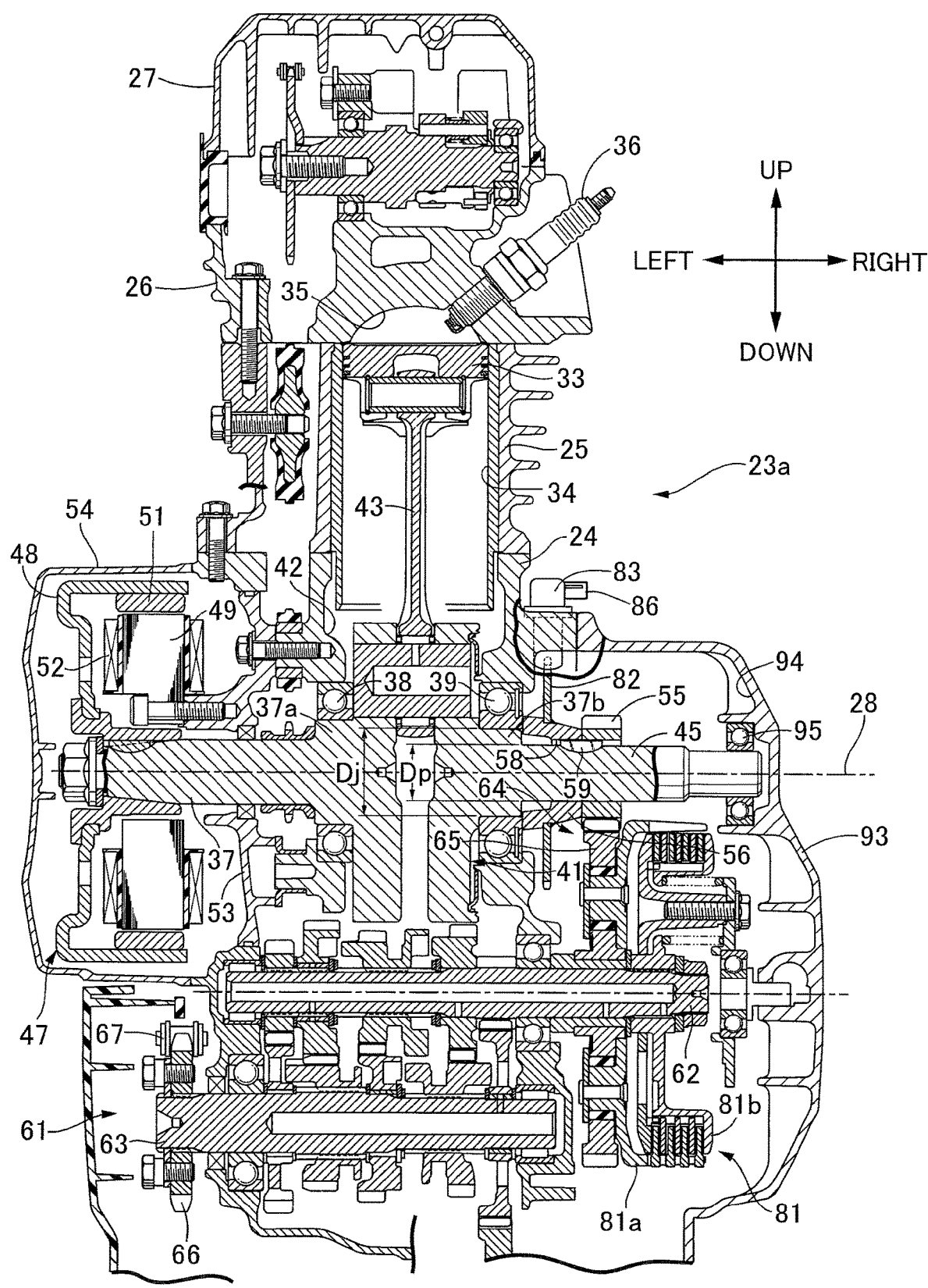
FIG. 4 is an enlarged sectional view, corresponding to FIG. 2, of an internal combustion engine related to another embodiment.

FIG. 4 schematically shows the structure of an internal combustion engine 23*a* related to another embodiment. The internal combustion engine 23*a* includes a clutch cover (case cover) 93 liquid-tightly joined to the crankcase 24 and covering the friction clutch 81. A space 94 housing, in addition to the friction clutch 81, the primary reduction mechanism 64, the collar member 56, the pulser ring 82, etc. is defined between the clutch cover 93 and the crankcase 24.

A bearing 95 is fitted into the clutch cover 93 so as to be coaxial with the rotational axis 28 of the crankshaft 37. The extremity of the crankshaft 37 is linked to the bearing 95. The extremity of the crankshaft 37 is thus supported on the clutch cover 93 so that it can rotate around the rotational axis 28. The bearing 95 is formed from a ball bearing. The outer race of the bearing 95 is fitted into the crankcase 24. The extremity of the crankshaft 37 is fitted into the inner race of the bearing 95. A plurality of balls are arranged between the outer race and the inner race.

In the internal combustion engine 23*a*, since the shaft on the other end side of the crankshaft 37 is doubly supported between the crankcase 24 and the clutch cover 93, it is possible to prevent run-out of the crankshaft 37.

The invention claimed is:

1. An internal combustion engine comprising:
   a crankcase that defines a crank chamber;
   a crankshaft that has a journal linked to a bearing and is rotatably supported on the crankcase;
   a power transmission gear fixed to an extremity of the crankshaft that has a smaller diameter than a diameter of the journal and projects outward of the crankcase;
   a to-be-detected body that is provided on an outer periphery of a collar member sandwiched between the bearing and the power transmission gear and is relatively non-rotatably supported on the crankshaft;
   a detection sensor that is made to face a trajectory of the to-be-detected body and detects movement of the to-be-detected body to generate a pulse signal;
   a key groove formed in inner peripheral faces of the power transmission gear and the collar member and extending in an axial direction of the crankshaft; and
   a key member projecting from an outer periphery of the crankshaft and fitted into the key groove,
   wherein the key member engages with the key groove and is disposed between both the power transmission gear and collar member and the crankshaft.

2. The internal combustion engine according to claim 1, further comprising an AC generator that is connected to an extremity of the crankshaft that projects outward from the crankcase in the axial direction of the crankshaft on a side opposite to the power transmission gear with respect to the crankcase.

3. The internal combustion engine according to claim 1, wherein the to-be-detected body is integrated with the collar member.

4. The internal combustion engine according to claim 1, wherein the detection sensor is provided on an upper face of the crankcase to the rear of a cylinder block in a vehicle body.

5. The internal combustion engine according to claim 1, further comprising a case cover that supports the extremity of the crankshaft.

* * * * *